United States Patent [19]

Chapa

[11] 4,329,084

[45] May 11, 1982

[54] DITCHING OVER BURIED LINES

[76] Inventor: Amadeo Chapa, 4 Talisman Ct., Houston, Tex. 77076

[21] Appl. No.: 124,154

[22] Filed: Feb. 25, 1980

[51] Int. Cl.³ ............................................... F16L 57/00
[52] U.S. Cl. ...................................... 405/157; 37/195
[58] Field of Search .................. 405/154, 157; 37/195, 37/80 R, 83, 192 A, DIG. 1, DIG. 17, DIG. 19; 138/104, 105, 106, 110

[56] References Cited

U.S. PATENT DOCUMENTS

| | | | |
|---|---|---|---|
| 384,948 | 6/1888 | Young | 138/105 |
| 3,734,137 | 5/1973 | Stanley | 138/105 |
| 3,807,183 | 4/1974 | Wolff | 405/157 |
| 3,911,602 | 10/1975 | Trevathan | 37/DIG. 1 X |

FOREIGN PATENT DOCUMENTS

| | | | |
|---|---|---|---|
| 7707168 | 12/1977 | Netherlands | 405/157 |
| 669006 | 6/1979 | U.S.S.R. | 405/157 |

*Primary Examiner*—David H. Corbin
*Attorney, Agent, or Firm*—Michael P. Breston

[57] ABSTRACT

The method of ditching over a buried line involves making a hole, in advance of ditching, down to a level near a section of the buried line lying at the intersection with a proposed trench, spanning the line section with a line protector, and driving a ditching machine so that its excavating member makes the trench and in so doing rides in the trench over the protector and above the line section.

4 Claims, 7 Drawing Figures

DITCHING OVER BURIED LINES

REFERENCE TO RELATED APPLICATION

This application is related to Applicant's copending application Ser. No. 124,159 filed on Feb. 25, 1980.

BACKGROUND OF THE INVENTION

This invention relates to the art of ditching in areas traversed by underground lines, such as buried pipelines, telephone and power cables, gas lines, etc.

Machines are now widely used for excavating such ditches and for laying such underground lines. But when such ditching machines are used in terrains traversed by buried lines, care must be exercised else the excavating member of the ditching machine can cut such existing buried lines.

At present, the intersection between a buried line and a proposed trench is excavated manually while the trenching machine is allowed to excavate only up to and on either side of said intersection so as not to cut the buried line. Such a procedure slows down considerably the speed within which the trench can be constructed.

SUMMARY OF THE INVENTION

The method of making a ditch which will cross a buried line comprises making a hole in advance of ditching down to a section of the buried line at the point of intersection with said ditch, spanning the line with a line protector, and moving an excavating member of a ditching machine over the protector, thereby protecting the line section during the trenching operation.

The line protector comprises a pair of spaced-apart pads supporting a bridge structure which has a pair of end shoulders. At least one anchor extends vertically downwardly from each pad.

It is a main object of the present invention to considerably reduce the amount of earth required to be removed in and around the intersection between a buried line and a ditch under construction, and to allow a ditching machine to ride over such intersection, thereby to greatly expedite the construction of the trench as well as to considerably reduce the cost thereof.

DETAILED DESCRIPTION OF PREFERRED EMBODIMENT

Figure 1:
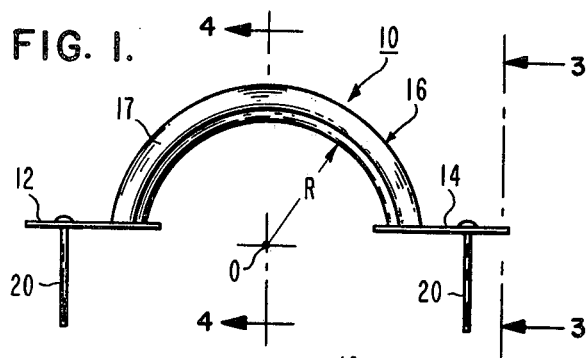
FIG. 1 is a front view in elevation of a line protector used to span and protect a buried pipeline at its intersection with a ditch under construction.
Figure 3:
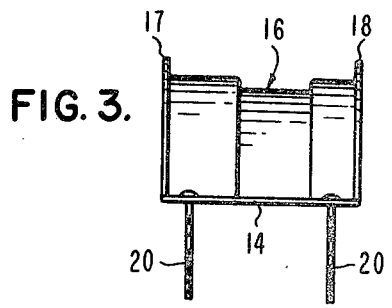
FIG. 3 is a side view taken along line 3—3 of FIG. 1.
Figure 2:
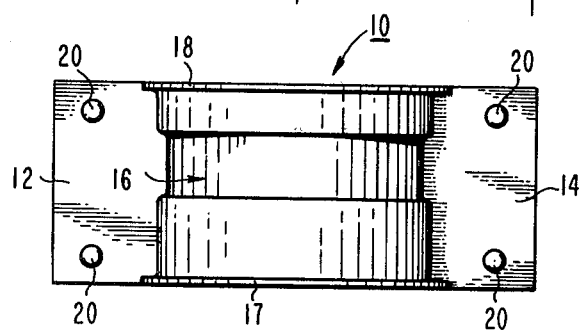
FIG. 2 is a top view of the protector shown in FIG. 1.
Figure 4:
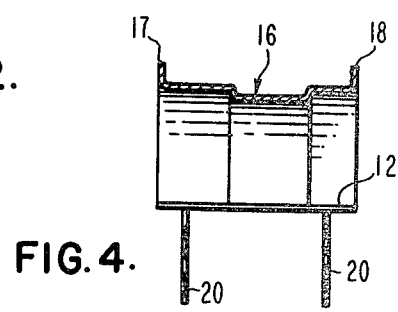
FIG. 4 is a sectional view taken on line 4—4 of FIG. 1.

Referring to the drawings, it is desired to make a ditch 38 (FIGS. 6-7) having a bottom 37 that would intersect an existing buried line, such as a pipeline 36 for the purpose of laying a new line therein, such as a pipeline 50.

Figure 5:
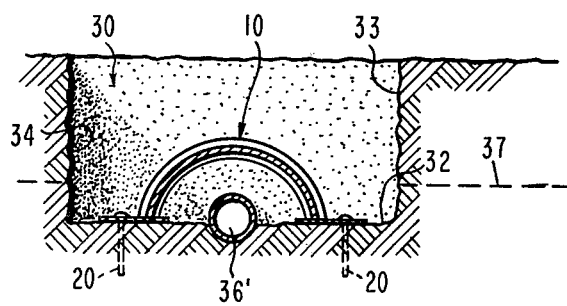
FIG. 5 is a sectional view of the hole dug out at the intersection showing the protector in place over the exposed pipe section.

This is accomplished, in accordance with the invention, by first digging out in the ground a hole 30 in advance of the ditching operation in order to detect and preferably expose a section 36' of the buried pipe 36 at the intersection between pipeline 36 and the trench 38 to be constructed. After hole 30 is dug out, which could be done manually with a shovel, then a line protector, generally designated as 10, is suitably disposed at the bottom of hole 30 in order to span over the pipe section 36' (FIG. 5). Line protector 10 is constructed to protect pipe section 36' and to support a ditch digging machine 40 (FIG. 6).

Line protector 10 serves as an arch structure and comprises a pair of shaped-apart horizontal pads 12, 14 supporting a generally semi-cylindrical bridge 16 and a pair of semi-circular end shoulders 17, 18. Bridge 16 has a longitudinal center axis O and is sustained by a radius R. One or more anchors 20 extend vertically downwardly from each of pads 12, 14.

Figure 6:
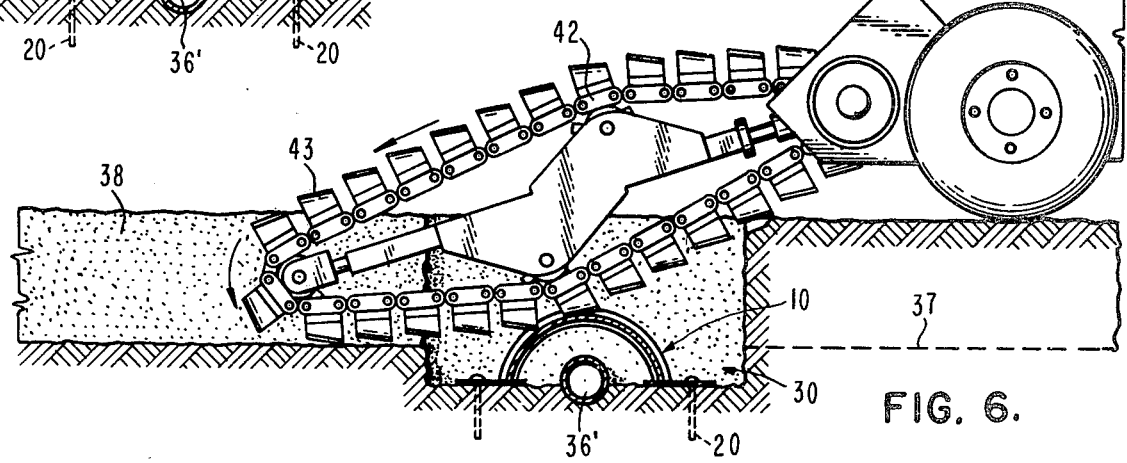
FIG. 6 is a partial side view of the rear end of a common ditching machine riding over and supported by the protector shown in FIG. 5.
Figure 7:
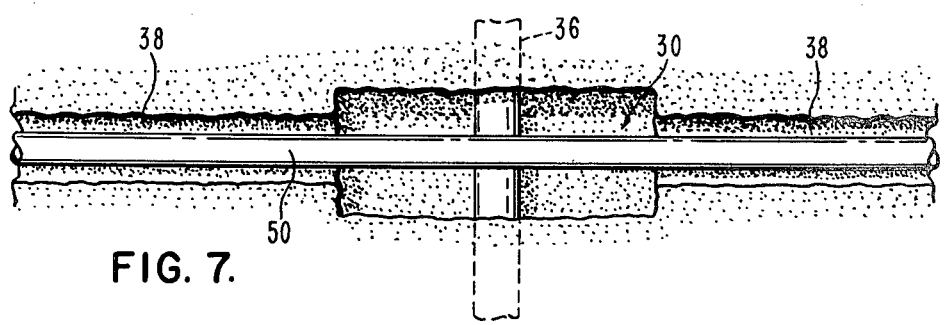
FIG. 7 is a top view of the hole and of the newly excavated ditch in which a new pipeline has been laid over the old buried pipeline.

In use, after the hole 30 is dug out, the line protector 10 is positioned so that its longitudinal axis O lies along the longitudinal axis of the exposed pipe section 36', and the anchors 20 are anchored into the bottom ground under hole 30 (FIGS. 5, 6).

The ditch digging machine 40 is then moved in the direction of arrow 41 to dig out the trench 38. The particular ditch digging machine 40 is illustrated as having a continuous chain 42 on which scoops or buckets 43 are mounted, and the chain is movable in a counter-clockwise direction, as indicated by the arrows.

As the machine 40 moves from left to right (as viewed in FIG. 6), it excavates the trench 38 of desired width and at a depth 37. When it reaches the intersection with pipe section 36', the chain 42 will ride over the bridge 16. End shoulders 17 and 18 prevent the accidental slipping off of chain 42 and its buckets 43, which otherwise would cut the pipe section 36' lying under the pipe protector 10. After the trench 38 is excavated, the desired pipeline 50 is laid therein.

It will be appreciated that the ditch excavating machine 40 can move over the trench-pipe intersection (36, 37) without interruption, in accordance with the invention, in the direction of arrow 41, as if the buried pipe 36 did not exist. Previously, machine 40 had to move towards such intersection from the opposite directions but not over such intersection.

What is claimed is:

1. A method of digging a trench along a predetermined trenchline in a terrain in which a pipe is buried below the ground surface, so that the bottom of the trench is above the pipe and the trenchline has with the pipe a point of intersection in a vertical plane, comprising:
    making a hole in the ground at said intersection at a depth approximating the desired depth of the trench,
    positioning at the bottom of the hole an arch structure for spanning and covering a small section of the pipe underneath the hole, and
    moving a trenching machine along the trench line toward said hole, the machine having a continuously movable chain for excavating the trench as it moves, and said chain riding over said arch structure, thereby allowing the machine to continuously dig out the trench over the pipe but without cutting the pipe.

2. The method of claim 1, wherein said arch structure having a generally semi-cylindrical bridge, and a pair of horizontal pads outwardly extending from the opposite outer ends of said bridge, said pads resting on the floor of said hole on the opposite sides of said pipe.

3. The method of claim 1, wherein said arch structure having a pair of spaced, upwardly-extending end shoulders, each lying in a plane substantially parallel to the trenchline, and said chain riding over said arch between said end shoulders.

4. The method of claim 2, wherein said bridge having a pair of spaced, upwardly-extending end shoulders, each lying in a plane substantially parallel to the trenchline, and said chain riding over said bridge between said end shoulders.

* * * * *